United States Patent
Sterbling et al.

(10) Patent No.: US 12,405,820 B2
(45) Date of Patent: Sep. 2, 2025

(54) CENTRAL RANDOMIZED SCHEDULER FOR HYPOTHESIS-BASED WORKLOADS

(71) Applicant: International Business Machines Corporation, Armonk, NY (US)

(72) Inventors: Sven Sterbling, Böblingen (DE); Joachim Gönnheimer, Walldorf (DE); Thomas Lumpp, Pliezhausen (DE)

(73) Assignee: International Business Machines Corporation, Armonk, NY (US)

(*) Notice: Subject to any disclaimer, the term of this patent is extended or adjusted under 35 U.S.C. 154(b) by 644 days.

(21) Appl. No.: 17/708,609

(22) Filed: Mar. 30, 2022

(65) Prior Publication Data

US 2023/0315517 A1    Oct. 5, 2023

(51) Int. Cl.
  *G06F 9/48* (2006.01)
  *G06F 9/50* (2006.01)
  *G06F 11/34* (2006.01)

(52) U.S. Cl.
  CPC ............ *G06F 9/4881* (2013.01); *G06F 9/505* (2013.01); *G06F 11/3409* (2013.01); *G06F 11/3414* (2013.01); *G06F 11/3433* (2013.01)

(58) Field of Classification Search
  None
  See application file for complete search history.

(56) References Cited

U.S. PATENT DOCUMENTS

| | | | |
|---|---|---|---|
| 8,057,826 B2 | 11/2011 | Seshi | |
| 8,316,190 B2 | 11/2012 | Holt | |
| 8,600,951 B2 | 12/2013 | Bosley | |
| 8,869,158 B2 | 10/2014 | Prabhakar | |
| 9,195,405 B2 | 11/2015 | Hamedani | |
| 9,218,142 B2 | 12/2015 | Hamedani | |
| 9,235,620 B2 | 1/2016 | Ciabrini | |
| 9,292,306 B2 | 3/2016 | Day | |

(Continued)

FOREIGN PATENT DOCUMENTS

| CN | 1997983 A | 7/2007 |
|---|---|---|
| CN | 102986163 A | 3/2013 |

(Continued)

OTHER PUBLICATIONS

Mu'alem et al., "Utilization, Predictability, Workloads, and User Runtime Estimates in Scheduling the IBM SP2 with Backfilling", Jun. 2001, IEEE Transactions on Parallel and Distributed Systems, vol. 12, No. 6, pp. 529-543. (Year: 2001).*

(Continued)

*Primary Examiner* — Qing Yuan Wu
(74) *Attorney, Agent, or Firm* — Heather Johnston (57) ABSTRACT

A system may include a memory and a processor in communication with the memory. The processor may be configured to perform operations. The operations may include loading environment rules and available workloads and retrieving workload data for the available workloads, execution environment data of an execution environment, and historic workload data. The operations may include selecting a workload for the execution environment and determining execution settings for the workload. The operations may include submitting the workload to an execution queue for execution in the execution environment according to the execution settings.

20 Claims, 7 Drawing Sheets

(56) References Cited

U.S. PATENT DOCUMENTS

| | | |
|---|---|---|
| 9,442,760 B2 | 9/2016 | Boutin |
| 10,225,207 B2 | 3/2019 | Steinder |
| 10,333,812 B2 | 6/2019 | Weinman, Jr. |
| 10,447,806 B1 | 10/2019 | Sahay |
| 10,529,353 B2 | 1/2020 | Maziewski |
| 10,664,837 B2 | 5/2020 | Greifeneder |
| 10,810,043 B2 | 10/2020 | Bahramshahry |
| 10,866,971 B2 | 12/2020 | Bensberg |
| 10,871,993 B2 | 12/2020 | Al-Turki |
| 10,901,373 B2 | 1/2021 | Locke |
| 10,956,222 B2 | 3/2021 | Bahramshahry |
| 11,277,390 B2 | 3/2022 | Verzun |
| 2008/0250213 A1 | 10/2008 | Holt |
| 2015/0073849 A1 | 3/2015 | Meyer |
| 2018/0113742 A1 | 4/2018 | Chung |
| 2018/0275625 A1 | 9/2018 | Park |
| 2018/0329741 A1 | 11/2018 | Yuan |
| 2019/0303200 A1 | 10/2019 | Sitaraman |
| 2020/0026563 A1 | 1/2020 | Bahramshahry |
| 2020/0233724 A1* | 7/2020 | Schmidt ............. G06F 11/3466 |
| 2020/0257680 A1 | 8/2020 | Danyi |
| 2020/0302187 A1 | 9/2020 | Wang |
| 2020/0342511 A1 | 10/2020 | Bursey |
| 2020/0394455 A1 | 12/2020 | Lee |
| 2020/0395117 A1 | 12/2020 | Schnorr |
| 2021/0067450 A1 | 3/2021 | Hanes |
| 2021/0073661 A1 | 3/2021 | Matlick |
| 2021/0092068 A1 | 3/2021 | Ismailsheriff |
| 2021/0173706 A1 | 6/2021 | Wong |

FOREIGN PATENT DOCUMENTS

| | | | |
|---|---|---|---|
| CN | 105308558 | A | 2/2016 |
| CN | 107533630 | A | 1/2018 |
| CN | 110010152 | A | 7/2019 |
| CN | 110024352 | A | 7/2019 |
| EP | 3735681 | A1 | 11/2020 |
| FR | 2839894 | A1 | 11/2003 |
| JP | 2015527144 | A | 9/2015 |
| JP | 2016518660 | A | 6/2016 |
| WO | 2004027581 | A3 | 4/2004 |
| WO | 2014015697 | A1 | 1/2014 |
| WO | 2014026753 | A1 | 2/2014 |
| WO | 2015006831 | A1 | 1/2015 |
| WO | 2018067956 | A1 | 4/2018 |
| WO | 2020251714 | A1 | 12/2020 |

OTHER PUBLICATIONS

"Infrastructure Layer > Scheduler", Gremlin Docs, downloaded from the Internet on Feb. 21, 2022, 1 page, <https://www.gremlin.com/docs/infrastructure-layer/scheduler/>.

"Scenarios > Overview", Gremlin Docs, downloaded from the Internet Feb. 21, 2022, 6 pages, <https://www.gremlin.com/docs/scenarios/overview/>.

"Scheduling your Experiments", downloaded from the Internet on Feb. 21, 2022, 2 pages, <https://chaostoolkit.org/reference/usage/scheduling/>.

Fawcett, Amanda, "Chaos engineering 101: Principles, process, and examples", Nov. 2, 2020, <https://www.educative.io/blog/chaos-engineering-process-principles>, 23 pages.

Mell et al., "The NIST Definition of Cloud Computing", Recommendations of the National Institute of Standards and Technology, NIST Special Publication 800-145, Sep. 2011, 7 pages.

Nathani, Sanjay, "Scheduling Chaos: An introduction to the Litmus Chaos Scheduler", Posted on Jul. 31, 2020, <https://dev.to/sanjay1611/scheduling-chaos-an-introduction-to-the-litmus-chaos-scheduler-4ca0>, 13 pages.

* cited by examiner

CENTRAL RANDOMIZED SCHEDULER FOR HYPOTHESIS-BASED WORKLOADS

BACKGROUND

The present disclosure relates to digital storage management and, more specifically, to scheduling digital workloads.

Workflow engines may enable the execution of defined workloads, including workloads which are pre-defined such as chaos workloads. Workflow engines may provide the ability to query a system and its state so as to provide the functionality for a form of time-based workload scheduling. A scheduling operator may be used for scheduling workloads.

SUMMARY

Embodiments of the present disclosure include a system, method, and computer program product for scheduling workloads. A system in accordance with the present disclosure may include a memory and a processor in communication with the memory. The processor may be configured to perform operations. The operations may include loading environment rules and available workloads and retrieving workload data for the available workloads, execution environment data of an execution environment, and historic workload data. The operations may include selecting a workload for the execution environment and determining execution settings for the workload. The operations may include submitting the workload to an execution queue for execution in the execution environment according to the execution settings.

The above summary is not intended to describe each illustrated embodiment or every implementation of the disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to digital storage management and, more specifically, to scheduling digital workloads.

Container orchestration systems (e.g., open-source container orchestration systems, such as a Kubernetes® cluster which may also be referred to as a k8s® cluster) provide support for automating containerized application deployment, scaling, and management. Containerized applications are typically deployed in a unit referred to as a pod, and a pod may have one or more containers running within it. As part of pod lifecycle management, a container orchestration system may provide one or more mechanisms for activating (also referred to as deploying or starting), running, and deactivating (also referred to as stopping) pods.

A workflow engine may enable execution of defined workloads, including workloads which are pre-defined such as chaos workloads. Chaos engineering may include the testing of a system to identify one or more critical failure points. A workflow engine may provide the ability to query a system and its state so as to enable time-based workload scheduling functionality. Workflow engine scheduling functionality may identify the location placement of a workload without considering the time placement of the workload.

Some embodiments of the present disclosure may enable workflow engines to abstract work over multiple environments rather than be constrained to work within a specific environment (e.g., a specific cluster in a container orchestration system). Some embodiments of the present disclosure may enable dynamic changing of workloads based on the state of the system the workloads are being deployed to. Some embodiments of the present disclosure may enable filtration of workloads based on the applicable rules and limitations of an environment and filtering out workloads that are not a fit for the environment.

Hypothesis-based workloads may be used in various applications such as, for example, chaos engineering. In chaos engineering, an engineer may define a hypothesis based on the behavior of a system at a steady-state, and the engineer may then run one or more experiments against the system with the intent to break the system to verify the steady-state hypothesis. Such an approach may build confidence in the robustness of the system.

The present disclosure may benefit hypothesis-based workload scheduling capabilities. For example, it may be preferable for a human operator to manually define execution schedules; the human operator may need to understand and consider the dynamic nature of the environment to be able to perform manual execution. For example, hypothesis-based workloads may be randomly scheduled; the scheduling component (which may also be referred to as a scheduler) may be necessary to handle the complexity that random assignment requires. In some embodiments of the present disclosure, a randomized workload scheduler may use a scheduling component, a rule registry, or similar mechanism for random workload assignment purposes.

A scheduling component may determine which specific hypothesis-based workload will be run at which exact time, in which time interval, and on which specific cloud environments given each cloud environment's specific constraints and/or attributes. A cloud environment may be, for example, an open-source container environment (e.g., one or more Kubernetes® clusters). Constraints and/or other attributes of an environment may include, for example, production, development, testing requirements, and/or environment limitations.

A scheduling component in accordance with the present disclosure may determine the specific target of the workload within an execution environment. For example, the scheduling component may determine the exact time and for which time interval a specific workload may be deployed to an open-source cluster; in some embodiments, the scheduling component may determine the specific cluster, node(s), and/or pod(s) to which the workload will be deployed.

In some embodiments, the time interval and specific target may be determined dynamically based on entries in a rule registry (e.g., a central environment rule registry), historical workload execution information (e.g., the results of previous workload executions), current environment key performance indicators (KPIs), and the labels, attributes, and similar properties of registered workloads (e.g., of workloads registered in a workload registration component).

A scheduling component may load rules for the environment from the rule registry (e.g., a central environment rule registry). The scheduling component may execute one or more operations for each environment to determine the next workload to be scheduled and determine the execution time of that workload. Operations the scheduling component may execute may include, for example, filtration of workload status, retrieval of information from a results database, retrieval of metrics and KPIs from the execution environment, selection of the workload from a workload registry, determination of execution start time, adjustment of execution start time, determination of intervals between workload actions, adjustments for workload-specific parameters, addition of the workload to the execution queue, and the like.

Filtration of workload status may include identifying applicable rules and limitations of an environment and filtering out workloads that are not a fit for the environment. For example, if an environment (e.g., a cluster) permits two workloads to run simultaneously, and the environment is currently running two workloads, then the scheduling component may identify that no additional workload may be run in that environment and thus not schedule the next workload to the environment. Similarly, if a workload requires more computing power than is assigned to a particular node, then the scheduling component may assign the workload to a different node.

Retrieval of information from the results database may include, for example, retrieval of hypothesis results, workload-specific metrics, and KPIs of previous experiments. Information may be retrieved from a database of information of completed experiments such as, for example, an historic execution results database. Retrieval of metrics may include the retrieval of current general metrics from, for example, the execution environment.

Selection of the workload from a workload registry may include selecting a specific workload. The workload selected may be included in a registry such as, for example, a hypothesis workload registration component. The workload may be selected based in whole or in part based on rules, past execution results (e.g., based on information from the historic execution results database), current KPIs, and the like.

Determination of execution start time may be based on, for example, rules, previous workload execution information (e.g., as identified from data in the historic execution results database), and/or environment KPIs. Any adjustment of execution start time may also be based on, for example, rules, previous workload execution (e.g., as identified from data in the historic execution results database), and/or environment KPIs. Determination of intervals between workload actions may also be based on, for example, rules, previous workload execution (e.g., as identified from data in the historic execution results database), environment KPIs, and the like.

Adjustments may be made for workload-specific parameters. The adjustments may be made to fine-tune workload execution. The adjustments may be based on, for example, rules, previous workload execution results (e.g., as pulled from the historic execution results database), environment KPIs, and the like.

The rule registry may contain relational and/or hierarchical information. The rule registry may be, for example, a central environment rule registry. Such information may represent categories, environment-specific metric thresholds, environment-specific KPI thresholds, criteria for determining workload scheduling changes (e.g., increasing the number of workloads if one threshold is reached and/or decreasing the number of workloads if another threshold is reached), execution intervals, and/or other variables. Such variables may influence one or more scheduling determinations by a scheduling component including, for example, decisions regarding which workload to schedule at which specific time to which particular environment.

A hypothesis workload registration component may contain definitions of one or more possible workloads that could be scheduled. In some embodiments, the hypothesis registration component may contain the definitions of all workloads awaiting scheduling. Such definitions may include metadata; for example, the hypothesis workload registration component definitions may include relationships between workloads, expected impact of the workloads on resources, expected impact of the workloads on the overall environment, other workload attributes, and/or labels that define the type of workload to be executed. Information in the hypothesis workload registration component (e.g., the labels) may be used to include or exclude workloads in the rule registry (e.g., the central environment rule registry).

A workload execution engine may run a workload. The workload execution engine may fetch the metadata of a scheduled workload from the execution queue. The workload execution engine may fetch the specific workload definition from the hypothesis workload registration component. The workload execution engine may execute the workload, check whether the hypothesis is met, collect workload-specific metrics and KPIs from the environment, and write the results into a results database (e.g., the historic execution results database).

The results database (e.g., historic execution results database) may store the results of one or more previous workload executions. The results data stored in the results database may include information about whether the hypothesis was met, workload-specific metrics, workload-specific KPIs, environment-specific metrics, environment-specific KPIs, data about the resources targeted by the workload during execution, and the like.

In some embodiments of the present disclosure, workload scheduling may be achieved based on scheduling timing, execution time, time until steady state reached, probe values, region, registered workloads, and the like. Other scheduling values may also be used including fixed scheduling values such as disk space, random access memory (RAM), central processing unit (CPU), and the like. A set of workload-specific probes may be defined (e.g., by a hypothesis workload) to assist in scheduling accuracy. Scheduling workload execution may thus be achieved specific to both workload, target, and environment.

A workload may include one or more actions and a hypothesis. Each action may perform one or more certain activities in an environment. The hypothesis may define the expected state of the environment after the actions have been performed. A scheduling component may load the rules from the rule registry (e.g., a central environment rule registry) and/or one or more of the available workloads from the workload registration component. The scheduling component may then perform certain operations for each execution environment.

The scheduler may retrieve information about the execution state of scheduled workloads from the execution queue; a workload execution state may be, for example, waiting (or pending), executing, finished (or complete), or similar identifier. The scheduler may retrieve the outcome(s) of previous workload executions in the environment from a results database (e.g., an historic execution results database); outcome information may include whether the hypothesis was fulfilled, workload-specific KPIs, workload-specific metrics, and the like. The scheduler may retrieve the KPIs and/or metrics from the execution environment. The exact way of how the scheduler retrieves the KPIs and/or metrics may depend on the kind of execution environment (e.g., querying a Prometheus instance).

The scheduler may start the selection algorithm. The selection algorithm may include selecting a new workload based on one or more rules defined in the rule registry (e.g., a central environment rule registry), the results of the historic workload executions (e.g., whether the hypothesis was met, historic workload-specific KPIs, and/or historic workload-specific metrics), the current KPIs and/or metrics from the targeted execution environment, and the like.

The scheduler may determine the exact execution start time and/or the time interval between individual actions within the workload if the workload consists of multiple actions. The scheduler may adjust workload-specific parameters to fine-tune the workload execution. The scheduler may further register the workload to the execution queue (also referred to as the workload execution queue).

The workload execution queue may store information about scheduled, running, and/or finished workloads. The information stored in the execution queue may include a unique workload identifier (also referred to as a workload ID), an identifier for the type of workload (e.g., a label, attribute, or relational data which may be stored in the workload registration component), data about the host execution environment, the state of the execution, a desired execution timestamp, and/or workload-specific parameters (e.g., yaml format parameters). The workload execution queue may act as the connection between the scheduler and the workload execution engine.

The workload execution engine may be responsible for executing a workload in a particular execution environment. The implementation of the workload execution engine and/or the execution it performs may differ depending on the workloads it executes and environments it executes the workloads in.

The workload execution engine may poll the workload execution queue in a set time interval (e.g., every five seconds) to identify new workloads awaiting execution. A workload may be in the queue with a status of awaiting execution; when the desired execution time is met or has passed, the workload execution engine may change the status to executing and load the workload information from the workload registration component via workload ID. The workload execution engine may apply the workload-specific parameters and execute the workload in the target execution environment. The workload execution engine may then query the execution environment for the outcome of the workload, write/record the results (e.g., whether the hypothesis was met and the specific KPIs) into the historic execution database, and updates the status of the workload in the workload execution queue to completed or finished. The results of the workload may be used in the selection process for subsequent workloads.

Some embodiments of the present disclosure may be used to conduct chaos engineering in a large scale open-source container-based (e.g., Kubernetes®-based) cloud platform. The cloud platform may have 20 clusters including 10 production clusters and 10 development clusters. The hypothesis-based workloads may be chaos experiments that consist of actions and probes. Actions may introduce chaos into the environment (e.g., deleting resources such as a node or a connection). Probes may be used in the hypothesis to define the expected state of the environment.

In such an embodiment, the scheduling component may load the rules (e.g., from a central environment rule registry) as well as the available workloads. The scheduler may perform tasks for each environment based on the rules. For example, according to the rules in the central environment rule registry, an experiment may be scheduled only on the cluster after the previous experiment has finished with no specific minimum time interval required in between; when the previous experiment finishes, the scheduling component may proceed.

In such an embodiment, the scheduler may retrieve the results of previously conducted chaos experiments from the results database. For example, the scheduler may identify that the last experiment introduced a memory leak and verified that the application was still able to store to and query information from an in-memory database; the hypothesis of the experiment was fulfilled and the workload-specific KPI results indicate the memory consumption of the worker nodes rose from 20% to 80% during the experiment.

In such an embodiment, the scheduler may retrieve current general metrics and KPIs from the target cluster. For example, such information may show that the memory consumption is currently at 20%. The scheduling component may select the same experiment from the workload registration component based on certain information. The information may include, for example, the rules from the central environment rule registry for the cluster may determine that the experiment should be immediately repeated with higher intensity if the hypothesis is fulfilled in a memory-leak experiment provided that the memory consumption of the environment has returned to the previous level again. The information may include, for example, that the hypothesis of the memory-leak experiment was fulfilled. The information may include, for example, that the current memory consumption is approximately at the same level as prior to the first experiment.

The scheduler may adjust the execution start time to the current time if the rules from the central environment rule registry state that the experiment should be conducted immediately under the previously outlined conditions. The scheduler may not have to provide a time interval if, for example, the experiment only contains one action that is executed once. The scheduler may adjust the parameter of the experiment to increase the memory-consumption of the nodes to 95% in the next experiment. The next experiment may then be added to the execution queue.

In some embodiments of the present disclosure, the workload execution engine may perform various tasks. The tasks may include polling the execution queue regularly (e.g., every few seconds) to identify whether a new experiment has been scheduled. The tasks may include retrieving a newly scheduled memory-leak experiment; the retrieval may contain the experiment ID, the experiment definition ID, the desired execution time, the parameters that determine the specific target, the intensity of the action, and/or other data as necessary for the execution of the workload. The tasks may include using the ID of the experiment definition to retrieve the actual chaos experiment definition from the workload registration component. The tasks may include the workload execution engine adjusting one or more parameters that determines the intensity of the memory-leak based on the information from the execution queue.

In some embodiments, the tasks may include executing such a chaos experiment against the target cluster. The tasks may include querying the cluster for the environment KPIs. The tasks may include checking whether the hypothesis (e.g., that the application is able to store to and retrieve data from the in-memory database) is fulfilled; the KPIs may show that memory consumption is above a set threshold (e.g., the memory consumption is at 100% which is higher than a 95% target) and that the hypothesis is not met. The tasks may include the execution engine writing all of the information into the historic execution database.

In such an embodiment, the scheduler may determine whether or not to re-run the memory leak experiment with the given intensity at the next iteration based, in whole or in part, on the result of the experiment. For example, the scheduler may determine to not re-run the experiment and instead proceed to a different experiment; if the scheduler determines to proceed from the 95% target experiment to another experiment, the next memory-consumption target for the memory-leak experiment may be set to 90%.

A system in accordance with the present disclosure may include a memory and a processor in communication with the memory. The processor may be configured to perform operations. The operations may include loading environment rules and available workloads and retrieving workload data for the available workloads, execution environment data of an execution environment, and historic workload data. The operations may include selecting a workload for the execution environment and determining execution settings for the workload. The operations may include submitting the workload to an execution queue for execution in the execution environment according to the execution settings.

In some embodiments of the present disclosure, the selecting the workload may include assessing rule filters, historic workload results, environment metrics, and historic metrics. In some embodiments, the environment metrics may include environment key performance indicators and the historic metrics may include historic key performance indicators.

In some embodiments of the present disclosure, the determining execution settings may include assigning an execution start time for the workload.

In some embodiments of the present disclosure, a selection algorithm may determine the execution settings for the workload using the workload data, the execution environment data, and the historic workload data.

In some embodiments of the present disclosure, the workload data may include workload-specific parameters.

In some embodiments of the present disclosure, the execution environment data may include at least one key performance indicator of the execution environment.

In some embodiments of the present disclosure, the historic workload data may include historic workload hypothesis results, historic workload key performance indicators, and historic workload metrics.

Figure 1:
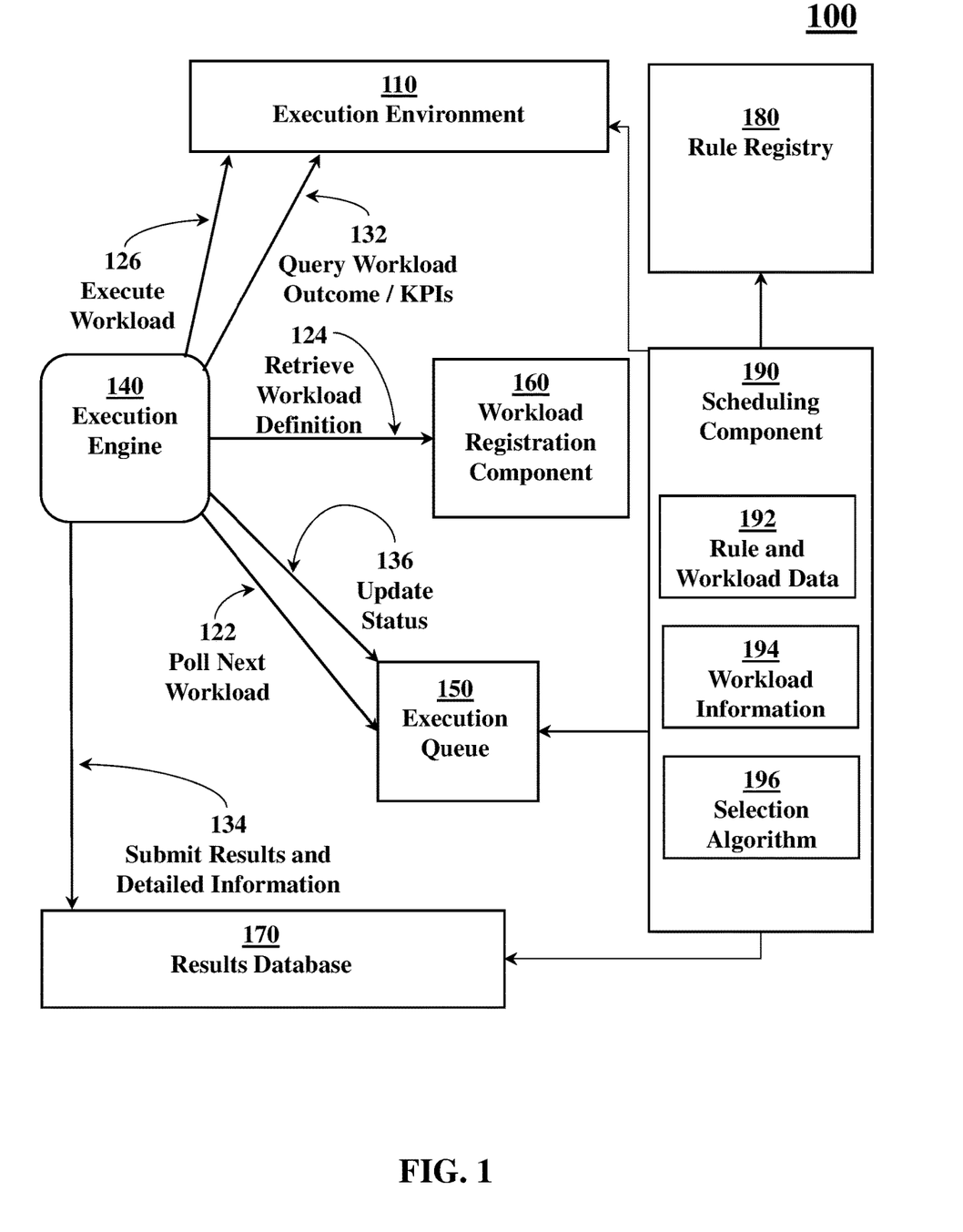
FIG. 1 illustrates a system of digital workload management in accordance with some embodiments of the present disclosure.

FIG. 1 illustrates a system 100 of digital workload management in accordance with some embodiments of the present disclosure. The system 100 includes an execution environment 110, an execution engine 140, an execution queue 150, a workload registration component 160, a results database 170, a rule registry 180, and a scheduling component 190.

The rule registry 180 may be a central environment rule registry. The rule registry 180 may contain various environment information, including environment-specific information. The rule registry 180 may contain, for example, relational and/or hierarchical information representing categories as well as thresholds for metrics and/or KPIs specific to the cloud environment. The rule registry 180 may include information that defines the rules for each specific environment. The rules in the rule registry 180 may be used to determine dynamically if, when, and/or how workloads are to be scheduled; such determinations may include workload-specific parameters.

The scheduling component 190 may load information for each environment (e.g., network, cluster, node, or pod). The scheduling component 190 may load rules from the rule registry 180 and/or workloads from the workload registration component 160; the scheduling component 190 may store the retrieved rule and workload data 192. The scheduling component 190 may pull queue information (e.g., scheduling status of workloads such as whether a workload is scheduled, awaiting execution, executing, or finished) from the execution queue 150, historic workload results (e.g., hypothesis results, workload-specific KPIs, and/or workload-specific metrics) from the results database 170, and/or current environment KPIs and/or metrics from the execution environment 110 and retain the data as workload information 194.

The scheduling component 190 includes a selection algorithm 196. The selection algorithm 196 may select a workload from the available workloads in the workload registration component 160 based on, for example, rule filters, historic workload hypothesis results, historic workload KPIs, historic workload metrics, current environment KPIs, current environment metrics, and the like. The selection algorithm 196 may determine an execution start time, interval adjustment, and/or workload-specific parameters (including, for example, adjustments thereto). The selection algorithm 196 may submit a selected workload to the execution queue 150.

The workload execution engine 140 may poll 122 the execution queue 150 for the next workload. The execution engine 140 may retrieve 124 the workload definition from the workload registration component 160. The workload execution engine 140 may execute 126 the workload against the execution environment 110. The execution engine 140 may query 132 the execution environment 110 for the workload outcome, KPIs, and related data. The workload execution engine 140 may submit 134 the hypothesis, hypothesis results, KPIs, and other information to the results database 170 (e.g., an historic execution results database). The execution engine 140 may update 136 the status of the workload on the execution queue 150.

Figure 2:
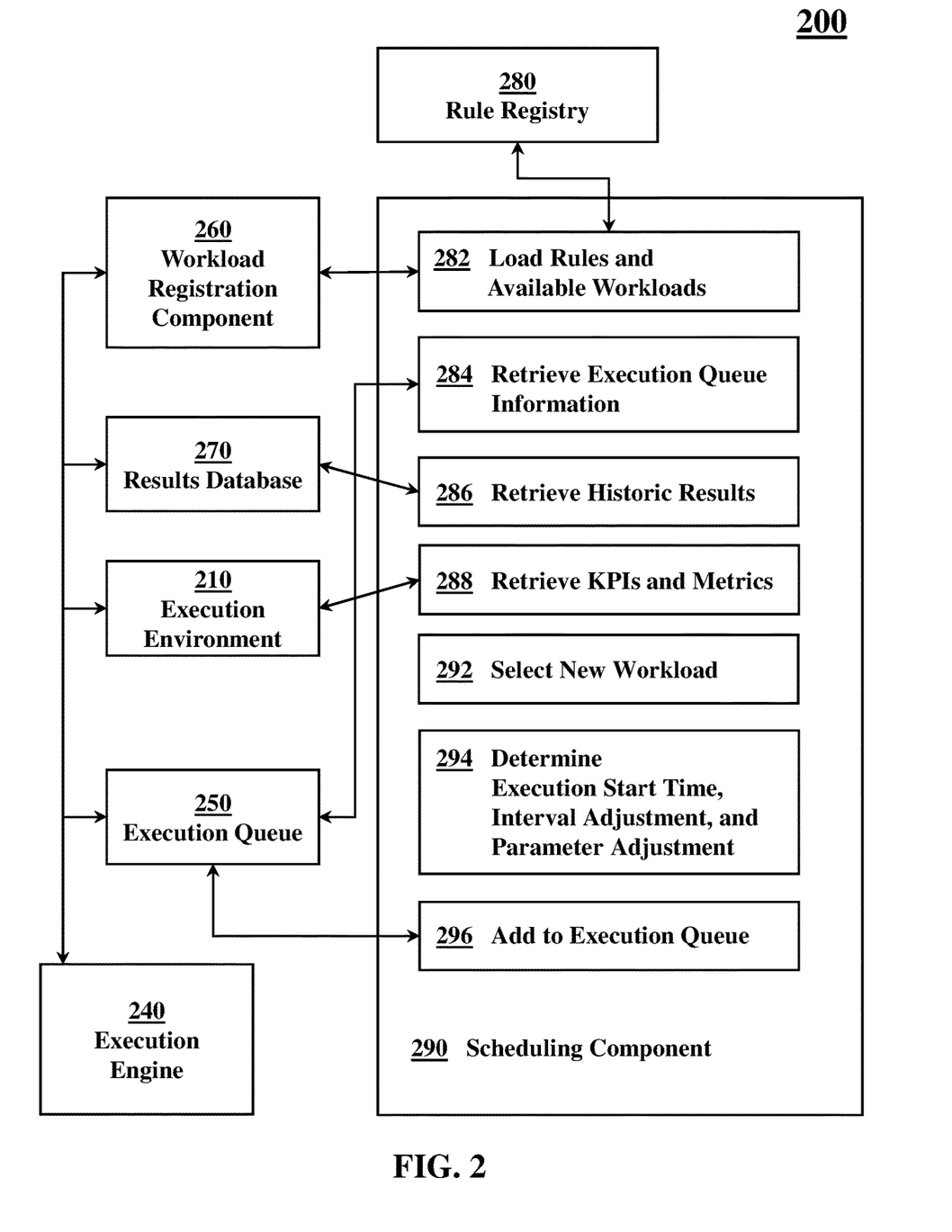
FIG. 2 depicts a system of digital workload management in accordance with some embodiments of the present disclosure.

FIG. 2 depicts a system 200 of digital workload management in accordance with some embodiments of the present disclosure. The system 200 includes an execution environment 210, an execution engine 240, an execution queue 250, a workload registration component 260, a results database 270, a rule registry 280, and a scheduling component 290.

The execution engine 240 is in communication with the execution queue 250, execution environment 210, results database 270, and workload registration component 260. The execution queue 250, execution environment 210, results database 270, workload registration component 260, and rule registry 280 are in communication with the scheduling component 290.

The scheduling component 290 may load 282 rules from the rule registry 280 and available workloads from the workload registration component 260. The scheduling component 290 may retrieve 284 execution queue information (e.g., status of one or more workloads such as pending, executing, or finished) from the execution queue 250. The scheduling component 290 may retrieve 286 historic results from the results database 270. The scheduling component 290 may retrieve 288 environment-specific KPIs and metrics from the execution environment 210. In some embodiments of the present disclosure, the load 282 rules, retrieve 284 queue data, retrieve 286 historic results, and retrieve 288 KPIs and metrics actions may be considered part of an information retrieval stage.

The scheduling component 290 may select 292 a new workload. The selection may be based on, for example, rule filters, historic workload hypothesis results, historic workload KPIs, historic workload metrics, current environment KPIs, current environment metrics, and the like. The scheduling component 290 may determine 294 an execution start time, interval adjustment, and/or a parameter adjustment for the new workload. In some embodiments of the present disclosure, the select 292 a workload and determine 294 actions may be considered part of a selection algorithm stage. The scheduling component 290 may add 296 the workload to the execution queue 250.

A computer-implemented method in accordance with the present disclosure may include loading environment rules and available workloads and retrieving workload data for the available workloads, execution environment data of an execution environment, and historic workload data. The method may include selecting a workload for the execution environment and determining execution settings for the workload. The method may include submitting the workload to an execution queue for execution in the execution environment according to the execution settings.

In some embodiments of the present disclosure, the selecting the workload may include assessing rule filters, historic workload results, environment metrics, and historic metrics. In some embodiments, the environment metrics may include environment key performance indicators and the historic metrics may include historic key performance indicators.

In some embodiments of the present disclosure, the determining execution settings may include assigning an execution start time for the workload.

In some embodiments of the present disclosure, a selection algorithm may determine the execution settings for the workload using the workload data, the execution environment data, and the historic workload data.

In some embodiments of the present disclosure, the workload data may include workload-specific parameters.

In some embodiments of the present disclosure, the execution environment data may include at least one key performance indicator of the execution environment.

In some embodiments of the present disclosure, the historic workload data may include historic workload hypothesis results, historic workload key performance indicators, and historic workload metrics.

Figure 3:
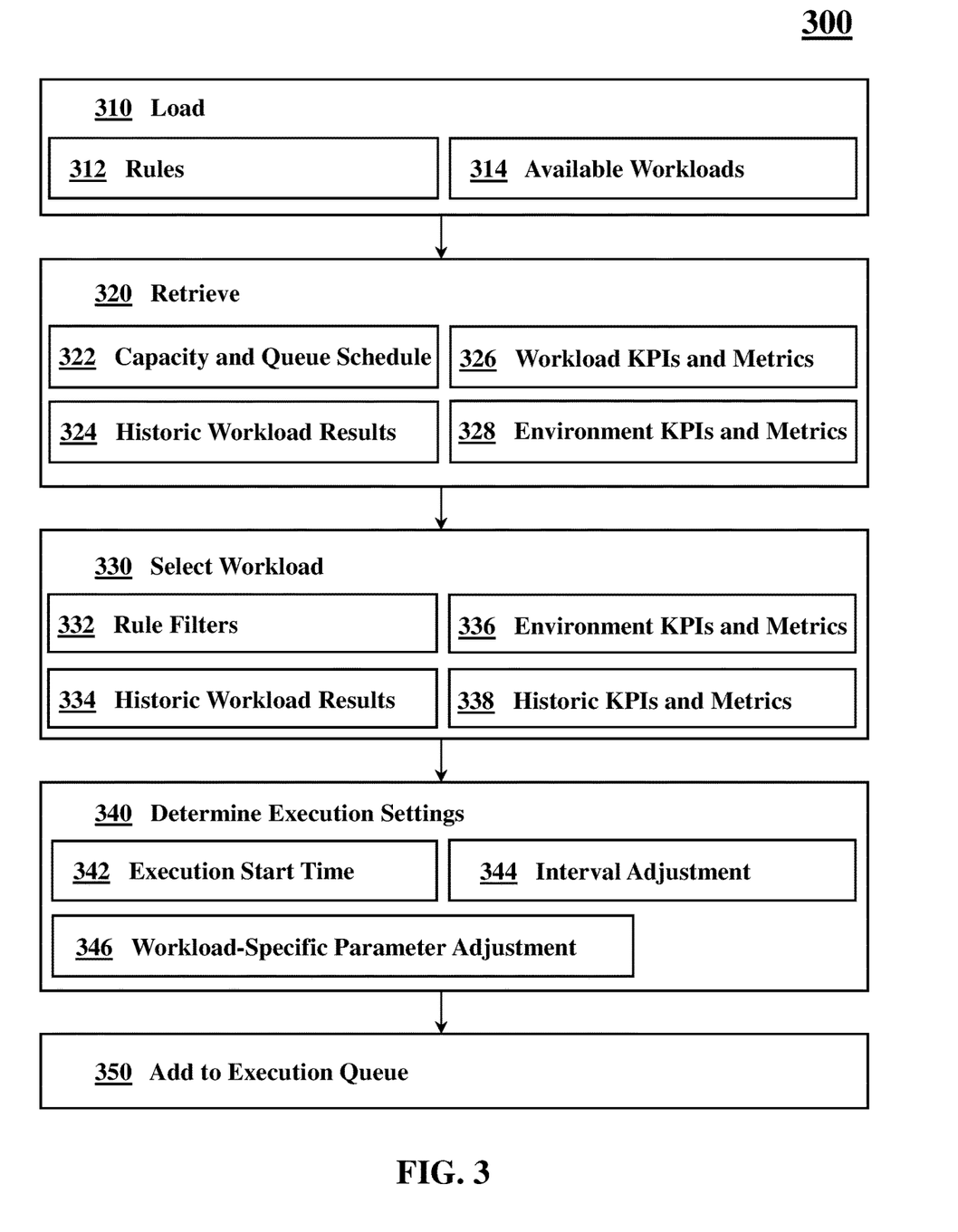
FIG. 3 illustrates a method of digital workload management in accordance with some embodiments of the present disclosure.

FIG. 3 illustrates a method 300 of digital workload management in accordance with some embodiments of the present disclosure. The method 300 includes loading 310 data, retrieving 320 information, selecting 330 a workload, determining 340 execution settings, and adding 350 a workload to an execution queue. The method 300 may be performed using a system of digital workload management (e.g., system 100 of FIG. 1 or system 200 of FIG. 2).

The method 300 includes loading 310 data. The data loaded may include rules 312 (e.g., from a rule registry 180 of FIG. 1 or rule registry 280 of FIG. 2) and available workloads 314 (e.g., from a workload registration component 160 of FIG. 1 or a workload registration component 260 of FIG. 2).

The method 300 includes retrieving 320 information. The information retrieved may include a capacity and queue schedule 322, historic workload results 324, workload KPIs and metrics 326, and/or environment KPIs and metrics 328. The information may be retrieved from, for example, an execution queue (e.g., execution queue 150 of FIG. 1 or execution queue 250 of FIG. 2), a results database (e.g., results database 170 of FIG. 1 or results database 270 of FIG. 2), an execution environment (e.g., execution environment 110 of FIG. 1 or execution environment 210 of FIG. 2), and the like.

The method 300 includes selecting 330 a workload. The selecting 330 may be based, in whole or in part, on rule filters 332, historic workload results 334, environment KPIs and metrics 336, and/or historic KPIs and metrics 338. In some embodiments, the rule filters 332 may filter out available workloads 314 based on rules 312 identified for a specific execution environment (e.g., execution environment 110 of FIG. 1 or execution environment 210 of FIG. 2). In some embodiments, selecting 330 a workload may include filtering based on rules for a specific execution environment given the historic workload results 334, environment KPIs and metrics 336, and/or the historic KPIs and metrics 338 of the execution environment.

The method 300 includes determining 340 execution settings; determining 340 the execution settings may include determining 340 an execution start time 342, an interval adjustment 344, and/or a workload-specific parameter adjustment 346. The method 300 includes adding 350 the workload to the execution queue.

Figure 4:
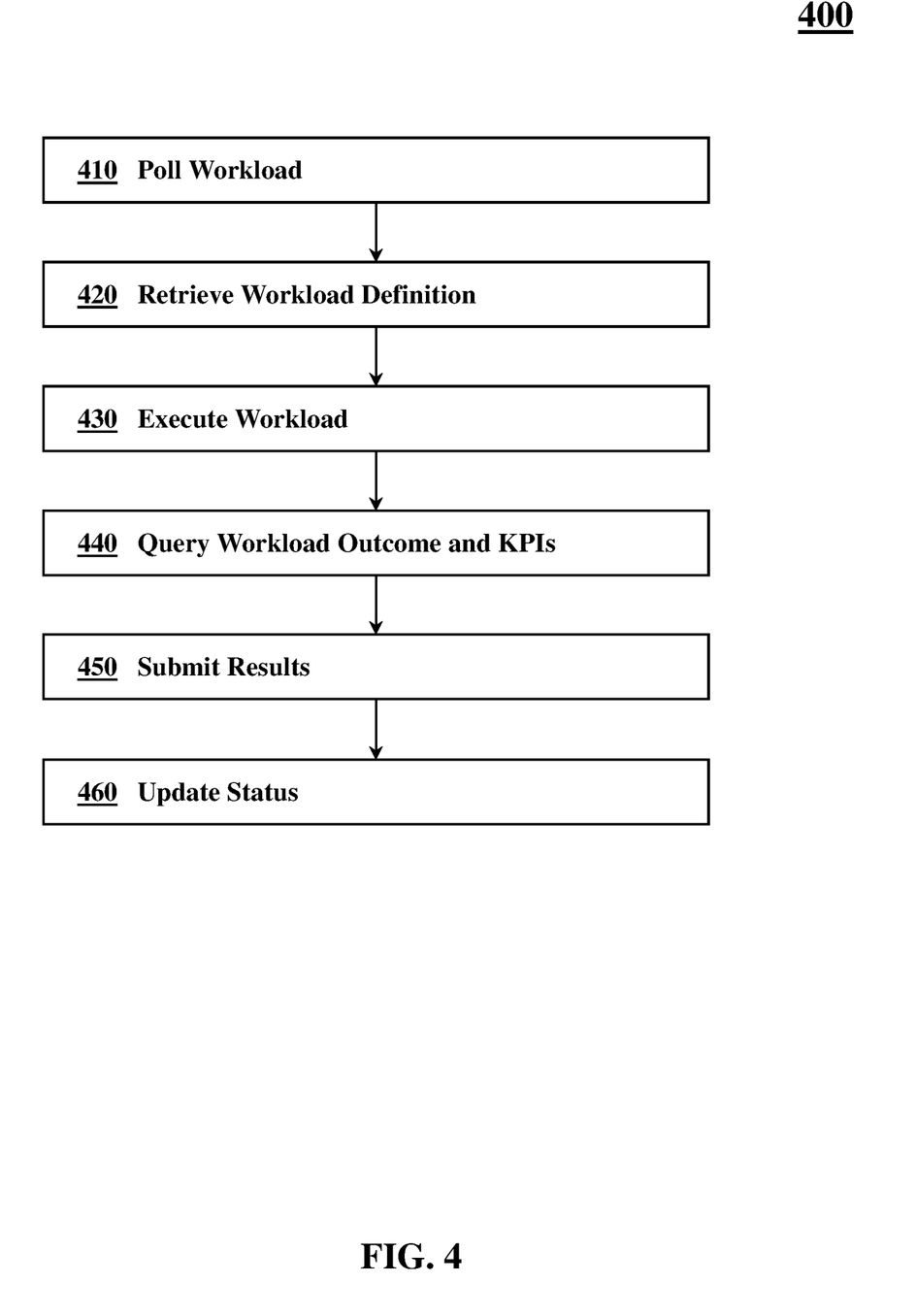
FIG. 4 depicts a method of digital workload management in accordance with some embodiments of the present disclosure.

FIG. 4 depicts a method 400 of digital workload management in accordance with some embodiments of the present disclosure. The method 400 may be performed using a system of digital workload management (e.g., system 100 of FIG. 1). The method 400 includes polling 410 a next workload; for example, an execution engine 140 may poll 122 an execution queue 150 as shown in FIG. 1. The method 400 includes retrieving 420 a workload definition; for example, an execution engine 140 may retrieve 124 a workload definition from a workload registration component 160 as shown in FIG. 1. The method 400 includes executing 430 a workload; for example, an execution engine 140 may execute 126 a workload in an execution environment 110 as shown in FIG. 1.

The method 400 includes querying 440 a workload outcome and KPIs; for example, an execution engine 140 may query 132 the workload outcome and KPIs from an execution environment 110 as shown in FIG. 1. The method 400 includes submitting 450 results to a results database; for example, an execution engine 140 may submit 134 results (e.g., hypothesis, the hypothesis results, the KPI results, and/or other information) to a results database 170 as shown in FIG. 1. The method 400 includes updating 460 the status of the workload; for example, an execution engine 140 may update 136 the status of the workload in an execution queue 150 as shown in FIG. 1.

A computer program product in accordance with the present disclosure may include a computer readable storage medium having program instructions embodied therewith. The program instructions may be executable by a processor to cause the processor to perform a function. The function may include loading environment rules and available workloads and retrieving workload data for the available workloads, execution environment data of an execution environment, and historic workload data. The function may include selecting a workload for the execution environment and determining execution settings for the workload. The function may include submitting the workload to an execution queue for execution in the execution environment according to the execution settings.

In some embodiments of the present disclosure, the selecting the workload may include assessing rule filters, historic workload results, environment metrics, and historic metrics. In some embodiments, the environment metrics may include environment key performance indicators and the historic metrics may include historic key performance indicators.

In some embodiments of the present disclosure, the determining execution settings may include assigning an execution start time for the workload.

In some embodiments of the present disclosure, a selection algorithm may determine the execution settings for the workload using the workload data, the execution environment data, and the historic workload data.

In some embodiments of the present disclosure, the workload data includes workload-specific parameters.

In some embodiments of the present disclosure, the execution environment data includes at least one key performance indicator of the execution environment.

In some embodiments of the present disclosure, the historic workload data includes historic workload hypothesis results, historic workload key performance indicators, and historic workload metrics.

It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment currently known or that which may be later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model with different physical and virtual resources dynamically assigned and reassigned according to demand. There is a sense of portion independence in that the consumer generally has no control or knowledge over the exact portion of the provided resources but may be able to specify portion at a higher level of abstraction (e.g., country, state, or datacenter).

Rapid elasticity: capabilities can be rapidly and elastically provisioned, in some cases automatically, to quickly scale out and rapidly release to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but the consumer has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software which may include operating systems and applications. The consumer does not manage or control the underlying cloud infrastructure but has control over operating systems, storage, and deployed applications, and the consumer possibly has limited control of select networking components (e.g., host firewalls).

Deployment models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and/or compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
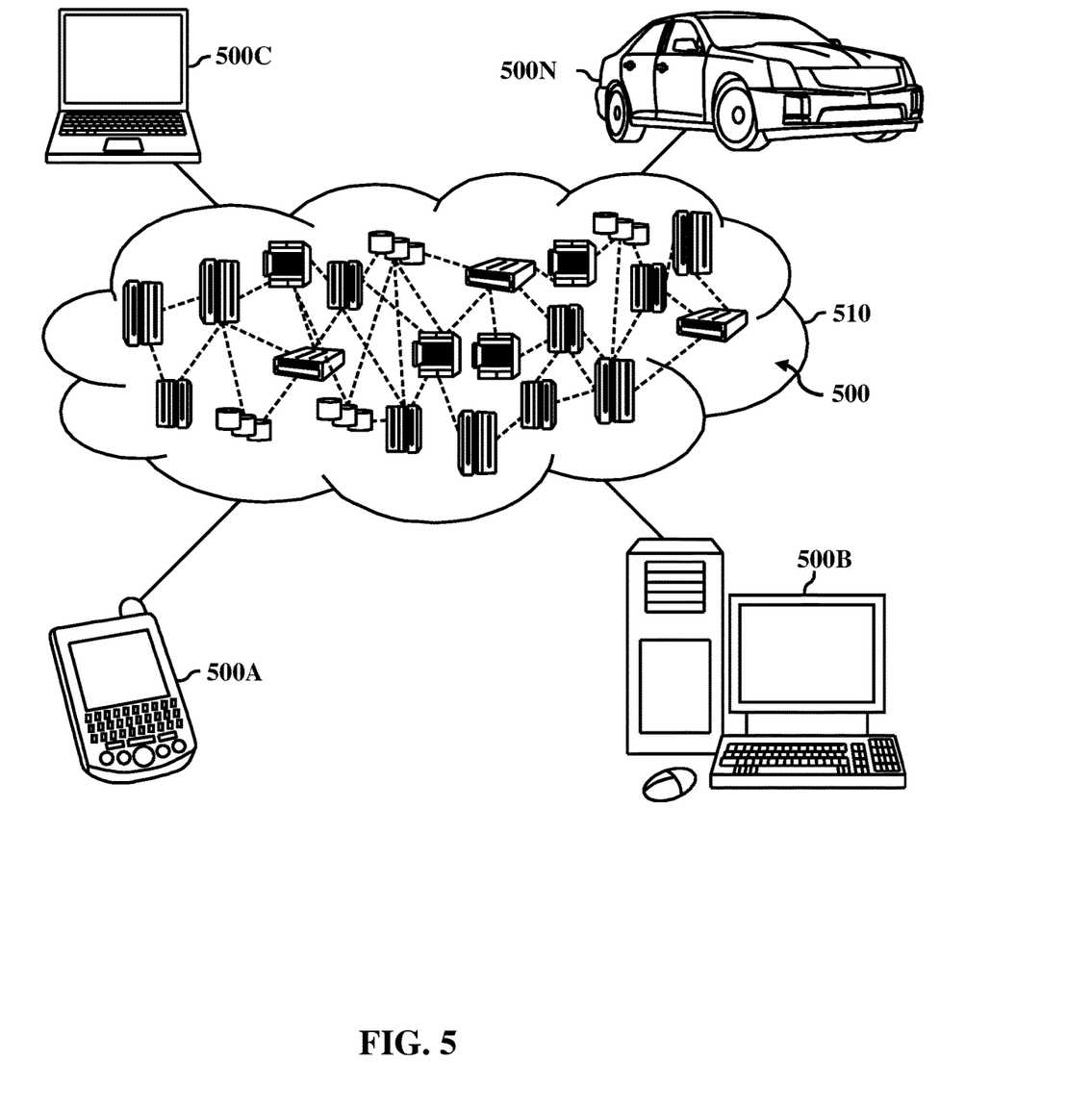
FIG. 5 illustrates a cloud computing environment in accordance with embodiments of the present disclosure.

FIG. 5 illustrates a cloud computing environment 510 in accordance with embodiments of the present disclosure. As shown, cloud computing environment 510 includes one or more cloud computing nodes 500 with which local computing devices used by cloud consumers such as, for example, personal digital assistant (PDA) or cellular telephone 500A, desktop computer 500B, laptop computer 500C, and/or automobile computer system 500N may communicate. Nodes 500 may communicate with one another. They may be grouped (not shown) physically or virtually, in one or more networks, such as private, community, public, or hybrid clouds as described hereinabove, or a combination thereof.

This allows cloud computing environment 510 to offer infrastructure, platforms, and/or software as services for which a cloud consumer does not need to maintain resources on a local computing device. It is understood that the types of computing devices 500A-N shown in FIG. 5 are intended to be illustrative only and that computing nodes 500 and cloud computing environment 510 can communicate with any type of computerized device over any type of network and/or network addressable connection (e.g., using a web browser).

Figure 6:
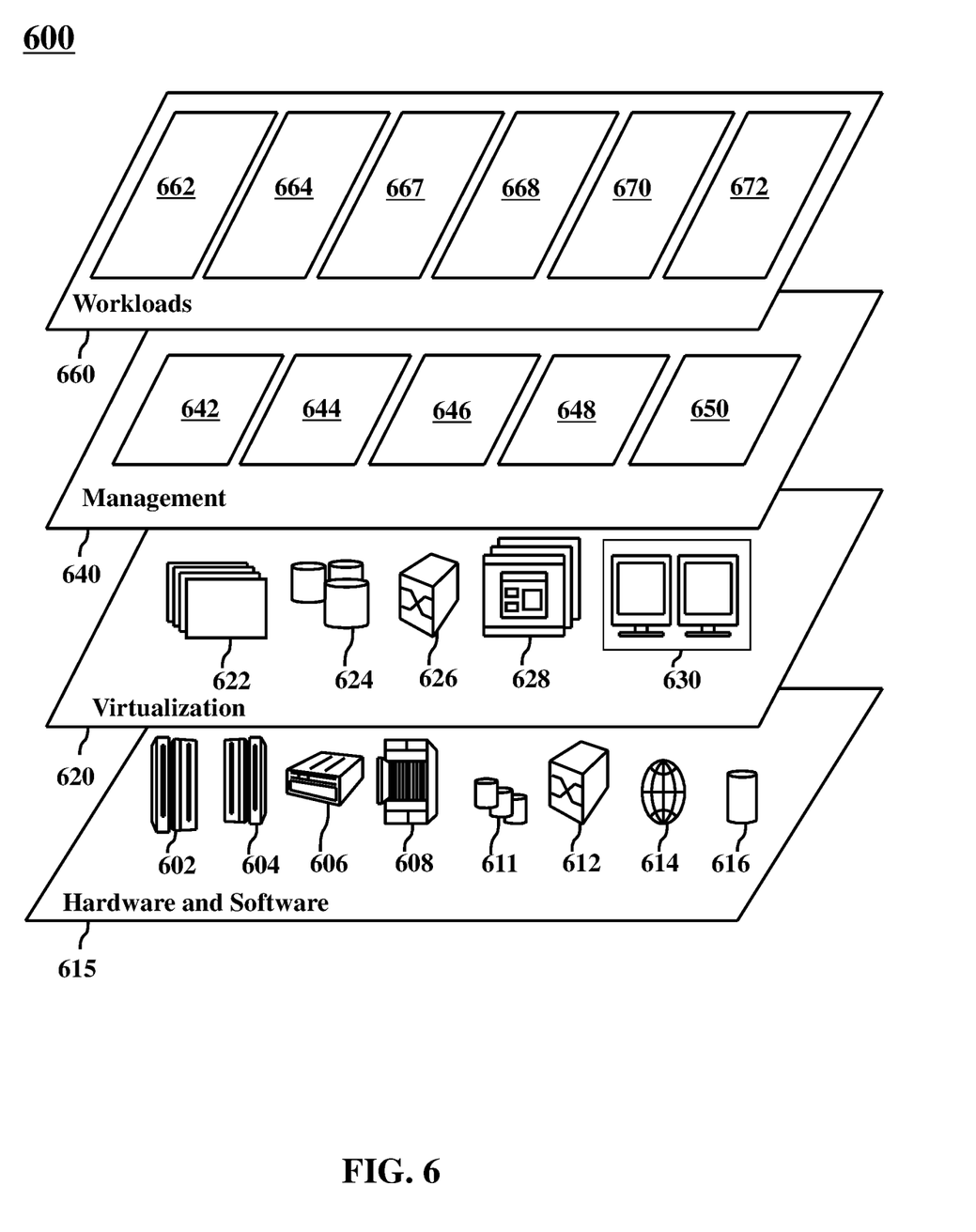
FIG. 6 depicts abstraction model layers in accordance with embodiments of the present disclosure.

FIG. 6 illustrates abstraction model layers 600 provided by cloud computing environment 510 (FIG. 5) in accordance with embodiments of the present disclosure. It should be understood in advance that the components, layers, and functions shown in FIG. 6 are intended to be illustrative only and embodiments of the disclosure are not limited thereto. As depicted below, the following layers and corresponding functions are provided.

Hardware and software layer 615 includes hardware and software components. Examples of hardware components include: mainframes 602; RISC (Reduced Instruction Set Computer) architecture-based servers 604; servers 606; blade servers 608; storage devices 611; and networks and networking components 612. In some embodiments, software components include network application server software 614 and database software 616.

Virtualization layer 620 provides an abstraction layer from which the following examples of virtual entities may be provided: virtual servers 622; virtual storage 624; virtual networks 626, including virtual private networks; virtual applications and operating systems 628; and virtual clients 630.

In one example, management layer 640 may provide the functions described below. Resource provisioning 642 provides dynamic procurement of computing resources and other resources that are utilized to perform tasks within the cloud computing environment. Metering and pricing 644 provide cost tracking as resources are utilized within the cloud computing environment as well as billing or invoicing for consumption of these resources. In one example, these resources may include application software licenses. Security provides identity verification for cloud consumers and tasks as well as protection for data and other resources. User portal 646 provides access to the cloud computing environment for consumers and system administrators. Service level management 648 provides cloud computing resource allocation and management such that required service levels are met. Service level agreement (SLA) planning and fulfillment 650 provide pre-arrangement for, and procurement of, cloud computing resources for which a future requirement is anticipated in accordance with an SLA.

Workloads layer 660 provides examples of functionality for which the cloud computing environment may be utilized. Examples of workloads and functions which may be provided from this layer include: mapping and navigation 662; software development and lifecycle management 664; virtual classroom education delivery 667; data analytics processing 668; transaction processing 670; and central randomized scheduler for hypothesis-based workloads 672.

Figure 7:
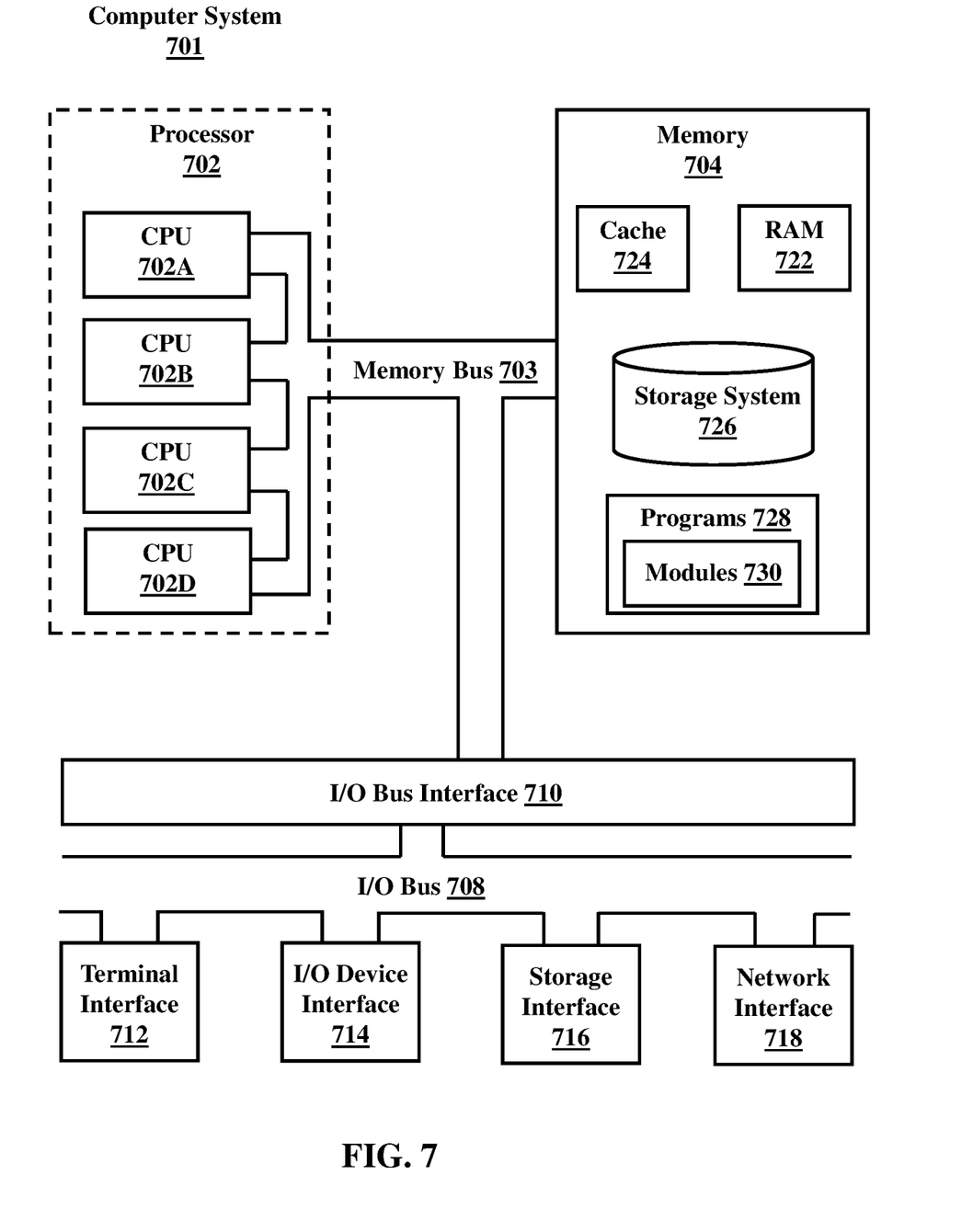
FIG. 7 illustrates a high-level block diagram of an example computer system that may be used in implementing one or more of the methods, tools, and modules, and any related functions, described herein, in accordance with embodiments of the present disclosure.

FIG. 7 illustrates a high-level block diagram of an example computer system 701 that may be used in implementing one or more of the methods, tools, and modules, and any related functions, described herein (e.g., using one or more processor circuits or computer processors of the computer) in accordance with embodiments of the present disclosure. In some embodiments, the major components of the computer system 701 may comprise a processor 702 with one or more central processing units (CPUs) 702A, 702B, 702C, and 702D, a memory subsystem 704, a terminal interface 712, a storage interface 716, an I/O (Input/Output) device interface 714, and a network interface 718, all of which may be communicatively coupled, directly or indirectly, for inter-component communication via a memory bus 703, an I/O bus 708, and an I/O bus interface unit 710.

The computer system 701 may contain one or more general-purpose programmable CPUs 702A, 702B, 702C, and 702D, herein generically referred to as the CPU 702. In some embodiments, the computer system 701 may contain multiple processors typical of a relatively large system; however, in other embodiments, the computer system 701 may alternatively be a single CPU system. Each CPU 702 may execute instructions stored in the memory subsystem 704 and may include one or more levels of on-board cache.

System memory 704 may include computer system readable media in the form of volatile memory, such as random access memory (RAM) 722 or cache memory 724. Computer system 701 may further include other removable/non-removable, volatile/non-volatile computer system storage media. By way of example only, storage system 726 can be provided for reading from and writing to a non-removable, non-volatile magnetic media, such as a "hard drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM, or other optical media can be provided. In addition, memory 704 can include flash memory, e.g., a flash memory stick drive or a flash drive. Memory devices can be connected to memory bus 703 by one or more data media interfaces. The memory 704 may include at least one program product having a set (e.g., at least one) of program modules that are configured to carry out the functions of various embodiments.

One or more programs/utilities 728, each having at least one set of program modules 730, may be stored in memory 704. The programs/utilities 728 may include a hypervisor (also referred to as a virtual machine monitor), one or more operating systems, one or more application programs, other program modules, and program data. Each of the operating systems, one or more application programs, other program modules, and program data, or some combination thereof, may include an implementation of a networking environment. Programs 728 and/or program modules 730 generally perform the functions or methodologies of various embodiments.

Although the memory bus 703 is shown in FIG. 7 as a single bus structure providing a direct communication path among the CPUs 702, the memory subsystem 704, and the I/O bus interface 710, the memory bus 703 may, in some embodiments, include multiple different buses or communication paths, which may be arranged in any of various forms, such as point-to-point links in hierarchical, star, or web configurations, multiple hierarchical buses, parallel and redundant paths, or any other appropriate type of configuration. Furthermore, while the I/O bus interface 710 and the I/O bus 708 are shown as single respective units, the computer system 701 may, in some embodiments, contain multiple I/O bus interface units 710, multiple I/O buses 708, or both. Further, while multiple I/O interface units 710 are shown, which separate the I/O bus 708 from various communications paths running to the various I/O devices, in other embodiments some or all of the I/O devices may be connected directly to one or more system I/O buses 708.

In some embodiments, the computer system 701 may be a multi-user mainframe computer system, a single-user system, a server computer, or similar device that has little or no direct user interface but receives requests from other computer systems (clients). Further, in some embodiments, the computer system 701 may be implemented as a desktop computer, portable computer, laptop or notebook computer, tablet computer, pocket computer, telephone, smartphone, network switches or routers, or any other appropriate type of electronic device.

It is noted that FIG. 7 is intended to depict the representative major components of an exemplary computer system 701. In some embodiments, however, individual components may have greater or lesser complexity than as represented in FIG. 7, components other than or in addition to those shown in FIG. 7 may be present, and the number, type, and configuration of such components may vary.

The present disclosure may be a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide, or other transmission media (e.g., light pulses passing through a fiber-optic cable) or electrical signals transmitted through a wire.

Computer readable program instructions described herein can be downloaded to respective computing/processing devices from a computer readable storage medium or to an external computer or external storage device via a network, for example, the Internet, a local area network, a wide area network, and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer, or entirely on a remote computer or server. In the latter scenario, the remote computer may be connected to the user's computer through any type of network, including a local area network (LAN) or a wide area network (WAN) or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present disclosure. In this regard, each block in the flowchart or block diagrams may represent a module, segment, or portion of instructions which comprises one or more executable instructions for implementing the specified logical function(s). In some alternative implementations, the functions noted in the blocks may occur out of the order noted in the figures. For example, two blocks shown in succession may, in fact, be accomplished as one step, executed concurrently, substantially concurrently, in a partially or wholly temporally overlapping manner, or the blocks may sometimes be executed in the reverse order depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Although the present disclosure has been described in terms of specific embodiments, it is anticipated that alterations and modifications thereof will become apparent to the skilled in the art. The descriptions of the various embodiments of the present disclosure have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application, or the technical improvement over technologies found in the marketplace or to enable others of ordinary skill in the art to understand the embodiments disclosed herein. Therefore, it is intended that the following claims be interpreted as covering all such alterations and modifications as fall within the true spirit and scope of the disclosure.

What is claimed is:

1. A system, said system comprising:
a memory; and
a processor in communication with said memory, said processor being configured to perform operations, said operations comprising:
loading environment rules and available workloads;
retrieving workload data for said available workloads, execution environment data of an execution environment, and historic workload data;
selecting a workload for said execution environment from said available workloads;
determining execution settings for said workload, wherein said execution settings include a setting selected from the group consisting of an execution start time, an interval adjustment, and a workload-specific parameter adjustment; and
submitting said workload to an execution queue for execution in said execution environment according to said execution settings.

2. The system of claim 1, wherein said selecting said workload comprises:
assessing rule filters, historic workload results, environment metrics, and historic metrics.

3. The system of claim 1, wherein said determining execution settings comprises:
assigning said execution start time for said workload.

4. The system of claim 1, wherein:
a selection algorithm determines said execution settings for said workload using said workload data, said execution environment data, and said historic workload data.

5. The system of claim 1, wherein:
said workload data includes workload-specific parameters.

6. The system of claim 1, wherein:
said execution environment data includes at least one key performance indicator of said execution environment.

7. The system of claim 1, wherein:
said historic workload data includes historic workload hypothesis results, historic workload key performance indicators, and historic workload metrics.

8. A computer-implemented method, said method comprising:
loading environment rules and available workloads;
retrieving workload data for said available workloads, execution environment data of an execution environment, and historic workload data;
selecting a workload for said execution environment from said available workloads;
determining execution settings for said workload, wherein said execution settings include a setting selected from the group consisting of an execution start time, an interval adjustment, and a workload-specific parameter adjustment; and
submitting said workload to an execution queue for execution in said execution environment according to said execution settings.

9. The computer-implemented method of claim 8, wherein said selecting said workload comprises:
assessing rule filters, historic workload results, environment metrics, and historic metrics.

10. The computer-implemented method of claim 9, wherein:
said environment metrics includes environment key performance indicators; and
said historic metrics includes historic key performance indicators.

11. The computer-implemented method of claim 8, wherein said determining execution settings comprises:
assigning said execution start time for said workload.

12. The computer-implemented method of claim 8, wherein:

a selection algorithm determines said execution settings for said workload using said workload data, said execution environment data, and said historic workload data.

13. The computer-implemented method of claim 8, wherein:
said workload data includes workload-specific parameters.

14. The computer-implemented method of claim 8, wherein:
said execution environment data includes at least one key performance indicator of said execution environment.

15. The computer-implemented method of claim 8, wherein:
said historic workload data includes historic workload hypothesis results, historic workload key performance indicators, and historic workload metrics.

16. The computer-implemented method of claim 8, wherein said execution start time is based at least in part on said environment rules.

17. The computer-implemented method of claim 8, said method further comprising:
adjusting a workload-specific parameter.

18. A computer program product, said computer program product comprising a computer readable storage medium having program instructions embodied therewith, said program instructions executable by a processor to cause said processor to perform a function, said function comprising:
loading environment rules and available workloads;
retrieving workload data for said available workloads, execution environment data of an execution environment, and historic workload data;
selecting a workload for said execution environment from said available workloads;
determining execution settings for said workload, wherein said execution settings include a setting selected from the group consisting of an execution start time, an interval adjustment, and a workload-specific parameter adjustment; and
submitting said workload to an execution queue for execution in said execution environment according to said execution settings.

19. The computer program product of claim 18, wherein said selecting said workload comprises:
assessing rule filters, historic workload results, environment metrics, and historic metrics.

20. The computer program product of claim 18, wherein:
a selection algorithm determines said execution settings for said workload using said workload data, said execution environment data, and said historic workload data.

* * * * *